United States Patent

Ihara

(10) Patent No.: US 9,614,997 B2
(45) Date of Patent: Apr. 4, 2017

(54) GRADATION DATA GENERATION DEVICE AND METHOD

(71) Applicant: JVC KENWOOD Corporation, Yokohama-shi, Kanagawa (JP)

(72) Inventor: Keiji Ihara, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 15/219,900

(22) Filed: Jul. 26, 2016

(65) Prior Publication Data

US 2016/0337552 A1 Nov. 17, 2016

Related U.S. Application Data

(63) Continuation of application No. PCT/JP2014/080742, filed on Nov. 20, 2014.

(30) Foreign Application Priority Data

Mar. 17, 2014 (JP) ................................. 2014-053177

(51) Int. Cl.
B41J 2/36 (2006.01)
H04N 1/40 (2006.01)
(Continued)

(52) U.S. Cl.
CPC .......... *H04N 1/40031* (2013.01); *B41J 2/325* (2013.01); *B41J 2/345* (2013.01); *B41J 2/355* (2013.01); *B41J 2/36* (2013.01)

(58) Field of Classification Search
CPC ....... B41J 2/52; B41J 2/35; B41J 2/355; B41J 2/3558; B41J 2/345; B41J 2/325;
(Continued)

(56) References Cited

U.S. PATENT DOCUMENTS

| | | | | |
|---|---|---|---|---|
| 6,195,110 B1 * | 2/2001 | Kokubo | ................... | B41J 2/355 347/180 |
| 6,313,857 B1 * | 11/2001 | Shimizu | ..................... | B41J 2/36 347/188 |
| 6,388,691 B1 * | 5/2002 | Maeyama | .................. | B41J 2/36 347/183 |

FOREIGN PATENT DOCUMENTS

JP        05-8427 A        1/1993

OTHER PUBLICATIONS

ISA 237 form dated Feb. 24, 2015 corresponding to International application No. PCT/JP2014/080742.

* cited by examiner

*Primary Examiner* — Kristal Feggins
(74) *Attorney, Agent, or Firm* — Nath, Goldberg & Meyer; Jerald L. Meyer

(57) ABSTRACT

N is defined to be an integer of 2 or more, and K is a positive integer that satisfies K<N. An arithmetic operation unit performs $2^K$ ways of processing, which are a sum of $2^K-1$ ways of processing for obtaining converted gradation data based on addition of high-order gradation data composed of high-order (N−K) bits of N-bit original gradation data and low-order K-bit data of the original gradation data, and processing directly using the high-order gradation data as the converted gradation data. A selector selects, in response to each of a plurality of heating resistors, any of the converted gradation data as gradation data for performing gradation recording by using a line thermal head including the plurality of heating resistors, the converted gradation data being obtained by the $2^K$ ways of processing.

5 Claims, 9 Drawing Sheets

(51) Int. Cl.
*B41J 2/325* (2006.01)
*B41J 2/355* (2006.01)
*B41J 2/345* (2006.01)

(58) Field of Classification Search
CPC ....... B41J 2/37; B41J 2/362; B41J 2/36; B41J 2/3555; H04N 1/40031; H04N 1/40087
See application file for complete search history.

A=D(N)/2
B=D(N)/2+LSB of D(N)

| (X) | 0<br>#1 | 1<br>#2 | 2<br>#3 | 3<br>#4 | 4<br>#5 | 5<br>#6 | 6<br>#7 | | | (Y) |
|---|---|---|---|---|---|---|---|---|---|---|
| | B | A | B | A | B | A | B | | FIRST LINE | 0 |
| | A | B | A | B | A | B | A | | SECOND LINE | 1 |
| | B | A | B | A | B | A | B | | THIRD LINE | 2 |
| | A | B | A | B | A | B | A | | FOURTH LINE | 3 |
| | B | A | B | A | B | A | B | | FIFTH LINE | 4 |
| | A | B | A | B | A | B | A | | SIXTH LINE | 5 |
| | B | A | B | A | B | A | B | | SEVENTH LINE | 6 |
| | A | B | A | B | A | B | A | | EIGHTH LINE | 7 |

PRINTING DIRECTION

| B | A | B | A | B | A | B |
|---|---|---|---|---|---|---|
| A | B | A | B | A | B | A |
| B | A | B | A | B | A | B |
| A | B | A | B | A | B | A |
| B | A | B | A | B | A | B |
| A | B | A | B | A | B | A |
| B | A | B | A | B | A | B |
| A | B | A | B | A | B | A |

FIG. 7B

| B | A | B | A | B | A | B |
|---|---|---|---|---|---|---|
| A | B | A | B | A | B | A |
| B | A | B | A | B | A | B |
| A | B | A | B | A | B | A |
| B | A | B | A | B | A | B |
| A | B | A | B | A | B | A |
| B | A | B | A | B | A | B |
| A | B | A | B | A | B | A |

| Y(1:0)= \ X(1:0)= | (0,0) | (0,1) | (1,0) | (1,1) |
|---|---|---|---|---|
| (0,0) | D2 | C2 | B2 | A2 |
| (0,1) | B2 | A2 | D2 | C2 |
| (1,0) | A2 | D2 | C2 | B2 |
| (1,1) | C2 | B2 | A2 | D2 |

A2=D(N)/4
B2=D(N)/4+[LSB(0) of D(N) or LSB(1) of D(N)]
C2=D(N)/4+LSB(1) of D(N)
B2=D(N)/4+[LSB(0) of D(N) and LSB(1) of D(N)]

FIG. 10

| (X) | 0 #1 | 1 #2 | 2 #3 | 3 #4 | 4 #5 | 5 #6 | 6 #7 | ... | (Y) |
|---|---|---|---|---|---|---|---|---|---|
| | D2 | C2 | B2 | A2 | D2 | C2 | B2 | FIRST LINE | 0 |
| | B2 | A2 | D2 | C2 | B2 | A2 | D2 | SECOND LINE | 1 |
| | A2 | D2 | C2 | B2 | A2 | D2 | C2 | THIRD LINE | 2 |
| | C2 | B2 | A2 | D2 | C2 | B2 | A2 | FOURTH LINE | 3 |
| | D2 | C2 | B2 | A2 | D2 | C2 | B2 | FIFTH LINE | 4 |
| | B2 | A2 | D2 | C2 | B2 | A2 | D2 | SIXTH LINE | 5 |
| | A2 | D2 | C2 | B2 | A2 | D2 | C2 | SEVENTH LINE | 6 |
| | C2 | B2 | A2 | D2 | C2 | B2 | A2 | EIGHTH LINE | 7 |

PRINTING DIRECTION

| D2 | C2 | B2 | A2 | D2 | C2 | B2 | A2 |
|---|---|---|---|---|---|---|---|
| B2 | A2 | D2 | C2 | B2 | A2 | D2 | C2 |
| A2 | D2 | C2 | B2 | A2 | D2 | C2 | B2 |
| C2 | B2 | A2 | D2 | C2 | B2 | A2 | D2 |
| D2 | C2 | B2 | A2 | D2 | C2 | B2 | A2 |
| B2 | A2 | D2 | C2 | B2 | A2 | D2 | C2 |
| A2 | D2 | C2 | B2 | A2 | D2 | C2 | B2 |
| C2 | B2 | A2 | D2 | C2 | B2 | A2 | D2 |

FIG. 11B

| D2 | C2 | B2 | A2 | D2 | C2 | B2 | A2 |
|---|---|---|---|---|---|---|---|
| B2 | A2 | C2 | D2 | B2 | A2 | C2 | D2 |
| C2 | D2 | A2 | B2 | C2 | D2 | A2 | B2 |
| A2 | B2 | D2 | C2 | A2 | B2 | D2 | C2 |
| D2 | C2 | B2 | A2 | D2 | C2 | B2 | A2 |
| B2 | A2 | C2 | D2 | B2 | A2 | C2 | D2 |
| C2 | D2 | A2 | B2 | C2 | D2 | A2 | B2 |
| A2 | B2 | D2 | C2 | A2 | B2 | D2 | C2 |

FIG. 11C

| D2 | C2 | B2 | A2 | D2 | C2 | B2 | A2 |
|---|---|---|---|---|---|---|---|
| B2 | A2 | D2 | C2 | B2 | A2 | D2 | C2 |
| C2 | B2 | A2 | D2 | C2 | B2 | A2 | D2 |
| A2 | D2 | C2 | B2 | A2 | D2 | C2 | B2 |
| D2 | C2 | B2 | A2 | D2 | C2 | B2 | A2 |
| B2 | A2 | D2 | C2 | B2 | A2 | D2 | C2 |
| C2 | B2 | A2 | D2 | C2 | B2 | A2 | D2 |
| A2 | D2 | C2 | B2 | A2 | D2 | C2 | B2 |

FIG. 11D

| D2 | C2 | B2 | A2 | D2 | C2 | B2 | A2 |
|---|---|---|---|---|---|---|---|
| B2 | A2 | D2 | C2 | B2 | A2 | D2 | C2 |
| C2 | D2 | A2 | B2 | C2 | D2 | A2 | B2 |
| A2 | B2 | C2 | D2 | A2 | B2 | C2 | D2 |
| D2 | C2 | B2 | A2 | D2 | C2 | B2 | A2 |
| B2 | A2 | D2 | C2 | B2 | A2 | D2 | C2 |
| C2 | D2 | A2 | B2 | C2 | D2 | A2 | B2 |
| A2 | B2 | C2 | D2 | A2 | B2 | C2 | D2 |

GRADATION DATA GENERATION DEVICE AND METHOD

CROSS REFERENCE TO RELATED APPLICATION

This application is a Continuation of PCT Application No. PCT/JP2014/080742 filed on Nov. 20, 2014, and claims the priority of Japanese Patent Application No. 2014-053177 filed on Mar. 17, 2014, the entire contents of both of which are incorporated herein by reference.

BACKGROUND

The present disclosure relates to a gradation data generation device and method for performing gradation recording by a thermal transfer system using a line thermal head.

In thermal transfer recording performed by using a line thermal head, there is known a gradation recording method of performing multi-level gradation recording on recording paper or the like, based on gradation data with plural bits. Japanese Unexamined Patent Application Publication No. H05-008427 describes an example of a printer that performs gradation recording.

SUMMARY

Incidentally, the market requires that the printer of the thermal transfer system be capable of high-speed recording at a low cost.

For example, when the number of bits of the gradation data is reduced, data processing is enabled even by inexpensive hardware of which performance is not high, and accordingly, it is possible to realize cost reduction.

Moreover, when the number of bits of the gradation data is reduced, the processing time (mainly the transfer time) of the gradation data is shortened, and accordingly, acceleration of the recording is realized.

However, when the number of bits of the gradation data is reduced, the number of gradations which can be expressed is reduced, and accordingly, there occurs a problem that quality of a recorded image is decreased. Therefore, it is desired that a gradation expression be kept even when the number of bits of the gradation data is reduced.

A first aspect of the embodiments provides a gradation data generation device including: an arithmetic operation unit configured, when N is an integer of 2 or more and K is a positive integer that satisfies K<N, to perform $2^K$ ways of processing, which are a sum of $2^K-1$ ways of processing for obtaining converted gradation data based on addition of high-order gradation data composed of high-order (N-K) bits of N-bit original gradation data and low-order K-bit data of the original gradation data, and processing directly using the high-order gradation data as the converted gradation data; and a selector configured to select, in response to each of a plurality of heating resistors, any of the converted gradation data as gradation data for performing gradation recording by using a line thermal head including the plurality of heating resistors, the converted gradation data being obtained by the $2^K$ ways of processing.

A second aspect of the embodiments provides a gradation data generation method including: obtaining high-order gradation data composed of high-order (N-K) bits of N-bit original gradation data, where N is an integer of 2 or more, and K is a positive integer that satisfies K<N; executing $2^K$ ways of processing, which are a sum of $2^K-1$ ways of processing for obtaining converged gradation data and processing of directly using the high-order gradation data as the converted gradation data, based on addition of the obtained high-order gradation data and low-order K-bit data of the original gradation data; and selecting, in response to each of a plurality of heating resistors, any of the converted gradation data as gradation data for performing gradation recording by using a line thermal head including the plurality of heating resistors, the converted gradation data being obtained by the $2^K$ ways of processing.

BRIEF DESCRIPTION OF THE DRAWINGS

FIG. 7A is a view for describing a recording result recorded by the thermal printer 52, which the data conversion processor 9 includes, in the case where an LSB of gradation data is 0.

FIG. 7B is a view for describing a recording result recorded by the thermal printer 52, which the data conversion processor 9 includes, in the case where the LSB of the gradation data is 1.

FIG. 9 is a view showing table TB2 stored in data select table 29a which the data conversion processor 29 includes.

FIG. 10 is a view for describing a setting pattern of processing A2, processing B2, processing C2, and processing D2, which are set by the data conversion processor 29.

FIG. 11A is a view for describing a recording result recorded by the thermal printer 52, which the data conversion processor 29 includes, in the case where LSB-side two bits of the gradation data are (0, 0).

FIG. 11B is a view for describing a recording result recorded by the thermal printer 52, which the data conversion processor 29 includes, in the case where the LSB-side two bits of the gradation data are (0, 1).

FIG. 11C is a view for describing a recording result recorded by the thermal printer 52, which the data conversion processor 29 includes, in the case where the LSB-side two bits of the gradation data are (1, 0).

FIG. 11D is a view for describing a recording result recorded by the thermal printer 52, which the data conversion processor 29 includes, in the case where the LSB-side two bits of the gradation data are (1, 1).

DETAILED DESCRIPTION

A description is made of a gradation data generation device according to at least one embodiment by preferred examples with reference to FIG. 1 to FIGS. 11A-11D.

(Example 1)

Figure 1:
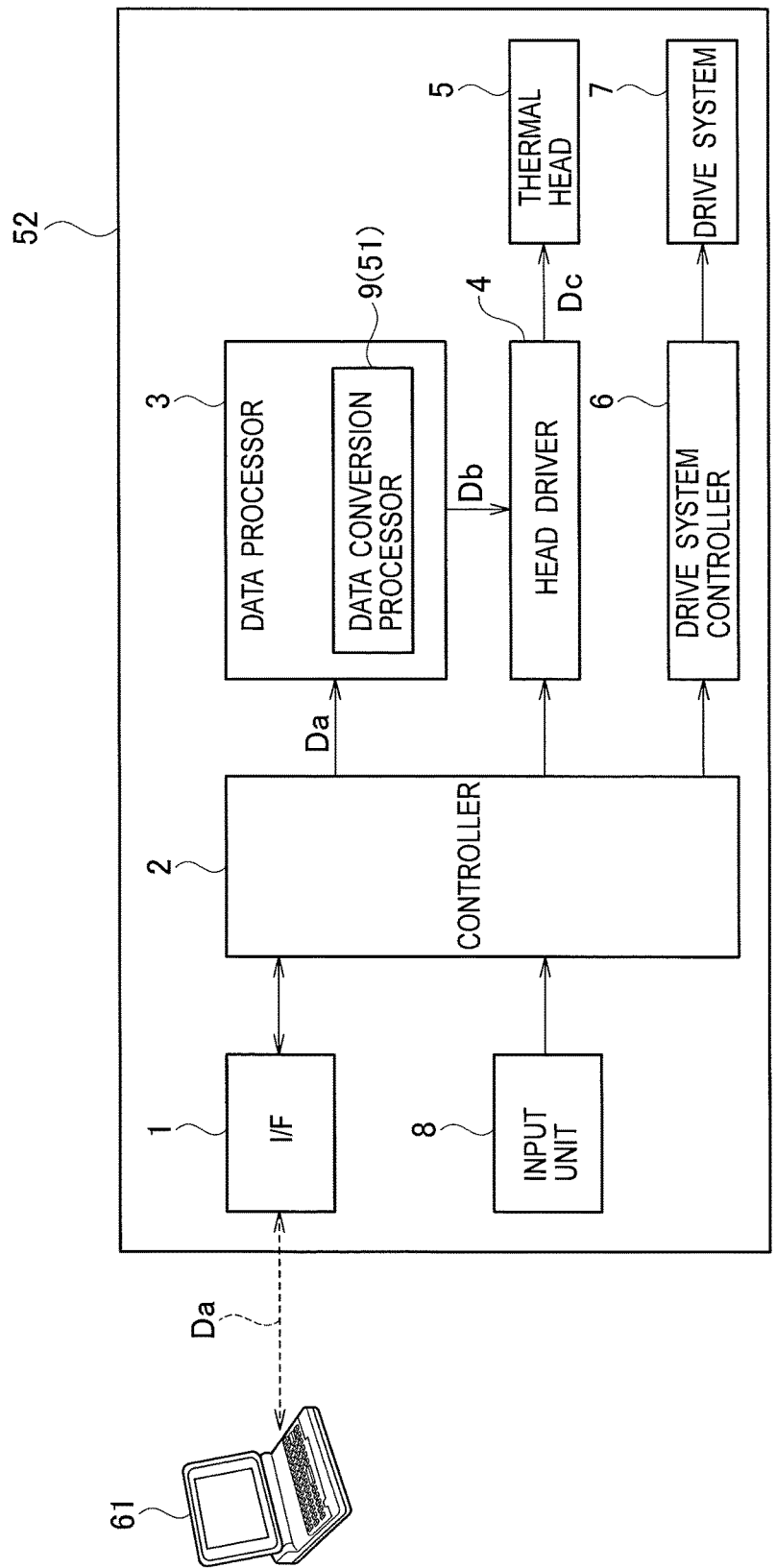
FIG. 1 is a block diagram showing thermal printer 52 including data conversion processor 9 that is Example 1 of a gradation data generation device according to at least one embodiment.

First, a description is made of a configuration of gradation data generation device 51 and thermal printer 52 of Example 1 with reference to FIG. 1. The thermal printer 52 is a device that uses a line thermal head 5 (hereinafter, simply referred to as a "thermal head 5") and performs gradation recording by melting or sublimating ink for a recording target material. As the recording target material, there is recording paper, a resin card (an ID card or the like), a resin film, or the like.

The thermal printer 52 includes: an interface (I/F) 1, a controller 2, a data processor 3, a head driver 4, the thermal head 5, a drive system controller 6, and a drive system 7. The thermal printer 52 includes an input unit 8 according to needs.

The controller 2 communicates with an external device (a personal computer or a data input device) 61 through the interface 1 by wire or wirelessly. By the communication, the controller 2 receives the data signal Da of an image or the like, which is to be recorded by the thermal printer 52.

The data processor 3 is subjected to operation control by the controller 2, and is supplied with the data signal Da and the like from the controller 2. The head driver 4 is subjected to operation control by the controller 2, and is supplied with a data signal Db, which includes gradation data S3 (details will be described later), from the data processor 3. The thermal head 5 is subjected to operation control by the head driver 4.

The drive system 7 is an operation system including a drive source such as a motor that conveys the recording paper and so on, and is subjected to operation control by the drive system controller 6. Control contents of the drive system controller 6 are controlled as a whole by the controller 2.

In the case where the thermal printer 52 includes the input unit 8, instructions or information regarding operations is inputted by a user by using the input unit 8.

The data processor 3 includes a data conversion processor 9. The data conversion processor 9 generates and outputs the gradation data S3 based on the data signal Da. The data conversion processor 9 corresponds to the gradation data generation device 51.

Figure 2:
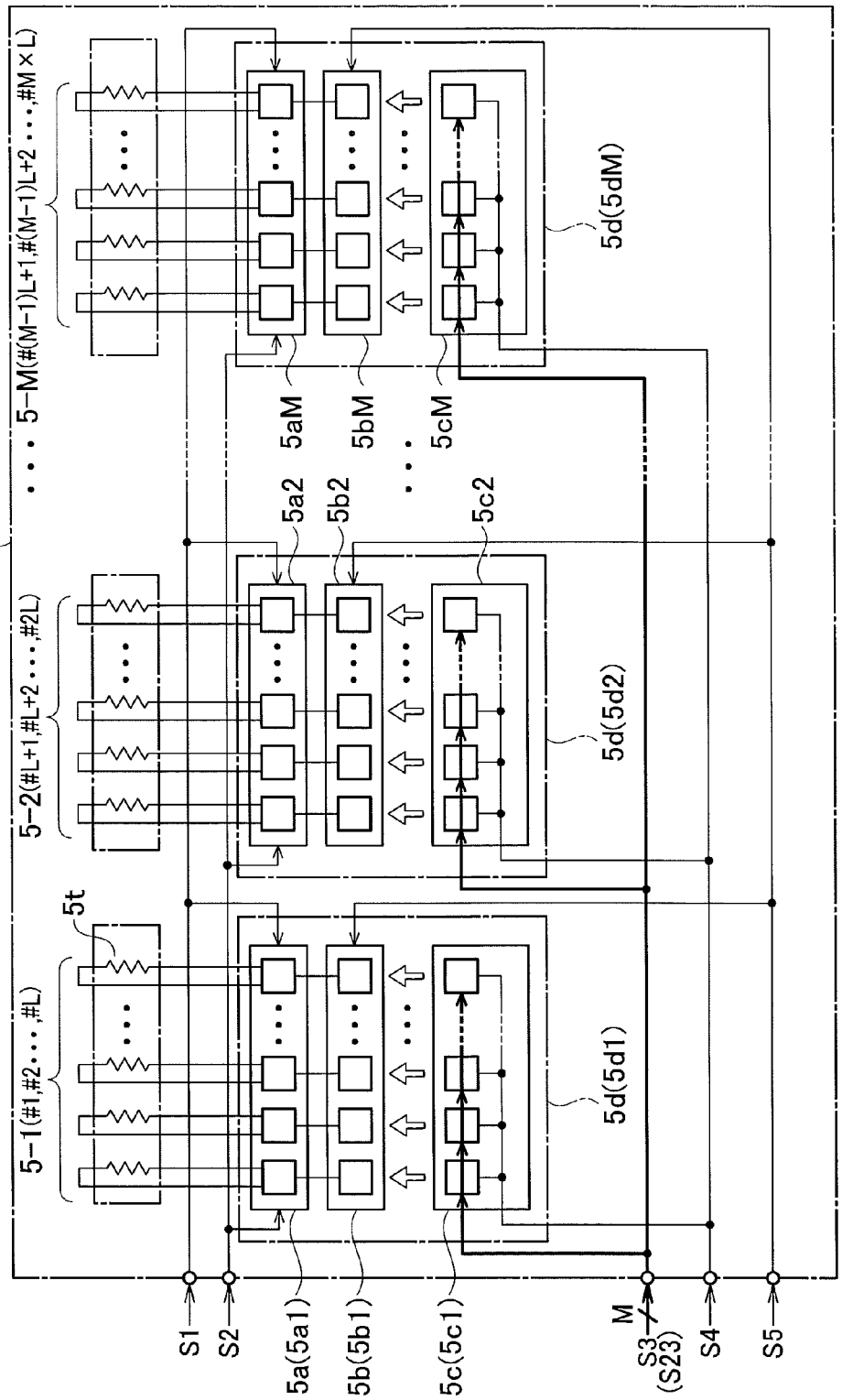
FIG. 2 is a block diagram for describing head driver 4 in the thermal printer 52.

FIG. 2 is a block diagram showing a configuration of the thermal head 5. The thermal head 5 is a line head having P pieces of heating resistors $5t$. Here, the relationship of P=M×L (both of M and L are positive integers) is defined. That is, the thermal head 5 includes the P pieces of heating resistors $5t$ which are the first one to the P(M×L)-th one. Hereinafter, numbers (ordinal numbers) are shown by #.

By the thermal head 5, the thermal printer 52 can record (print) an image, a letter, or the like on the recording target material under conditions where the number of dots per line is P, the number of lines is predetermined Q, and the number of gradations is predetermined G. Details of the number of gradations G will be described later.

The thermal head 5 includes M pieces of drivers $5d$ ($5d1$ to $5dM$), which energize and drive the totally P pieces of heating resistors $5t$ for each of the L pieces thereof. In each of the drivers $5d$, there is provided a drive circuit $5a$, latch circuit $5b$, and L-bit shift register $5c$.

In such a way, the thermal printer 52 is configured to energize and drive the P pieces of heating resistors $5t$ for each of the L pieces by the M pieces of drivers $5d$ ($5d1$ to $5dM$) independent of one another.

More specifically, the P pieces of the heating resistors $5t$ are partitioned into M pieces of the heating resistor groups 5-1 to 5-M, and are energized and driven by the drivers $5d1$ to $5dM$, which correspond thereto, respectively.

The heating resistor group 5-1 includes the #1 to #L heating resistors $5t$; the heating resistor group 5-2 includes the #(L+1) to #2L heating resistors $5t$; and the heating resistor group 5-M includes the #[(M−1)L+1] to #M×L heating resistors $5t$. Hence, for example, the heating resistor group 5-2 is energized and driven by the driver $5d2$.

Figure 3:
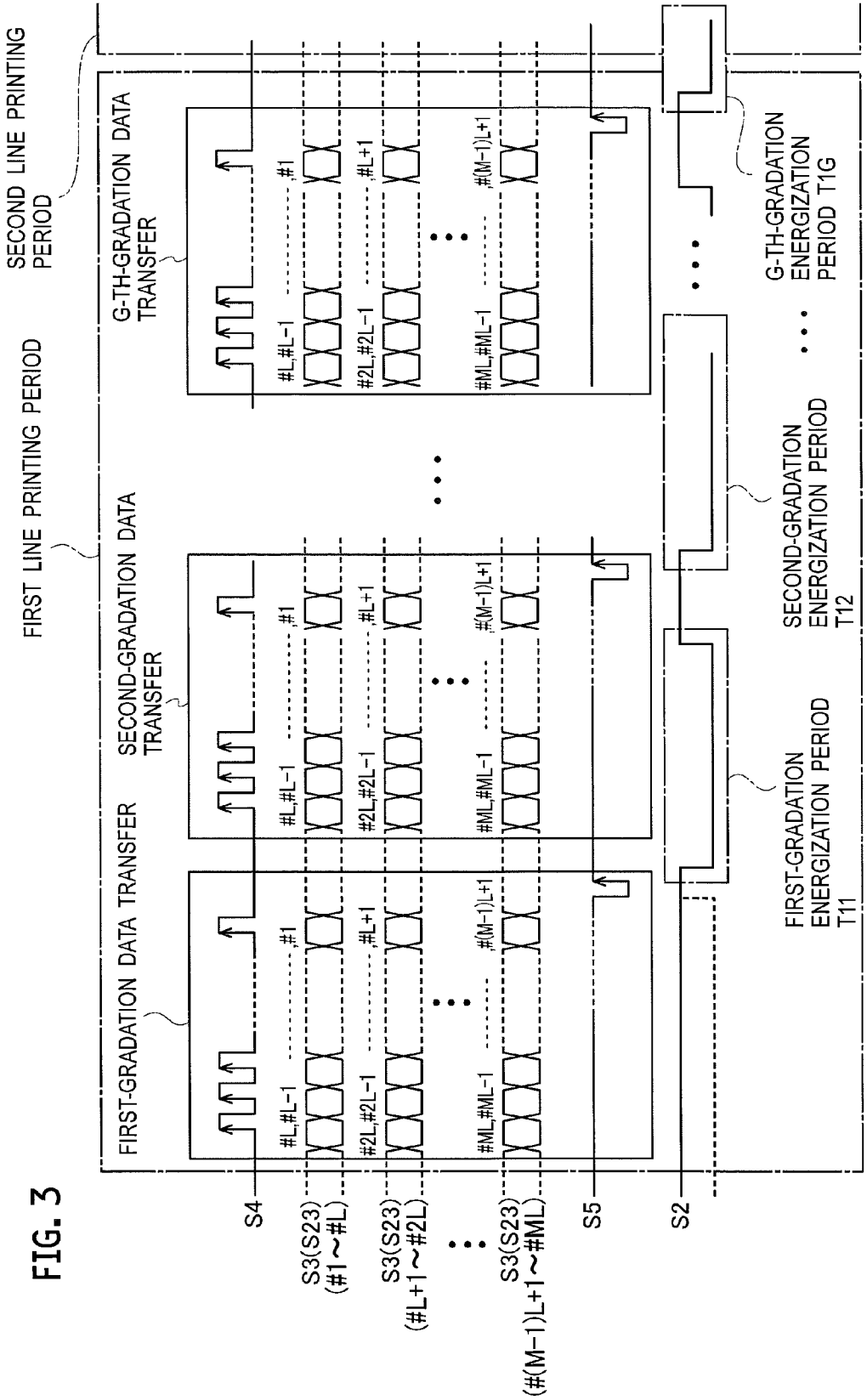
FIG. 3 is a diagram for describing a sequence of energization to line thermal head 5 by head driver 4.

Next, a description is made of the energization of the thermal head 5 with reference to FIG. 2 and FIG. 3. FIG. 3 is a diagram showing the sequence of the energization to the heating resistors $5t$.

For the energization of the heating resistors $5t$, the head driver 4 generates strobe signal S2, clock signal S4, and latch signal S5 as signals synchronized with the gradation data S3 which is supplied from the data processor 3 at the timing shown in FIG. 3.

The head driver 4 sends out, as a data signal DC, the gradation data S3, the strobe signal S2, the clock signal S4, and the latch signal S5 toward the thermal head 5.

In the event of driving the thermal head 5, first, the data transfer and the energization to the heating resistors $5t$ is performed in the first gradation of the first line in the number of lines Q.

Specifically, first, a data string in the gradation data S3 is supplied, which turns on/off the heating resistors $5t$ corresponding to the heating resistor group 5-1. The data string that turns on/off the heating resistors $5t$ is supplied as an L-bit data string, which is synchronized with the clock signal S4, to a shift register $5c1$ of the driver $5d1$. When each bit of the L-bit data string is 1, the heating resistors $5t$ turn on.

In a similar way, data strings, which turn on/off the heating resistors $5t$ corresponding to the heating resistor group 5-2 to the heating resistor group 5-M, are also sequentially supplied as the first gradation of the first line to the shift registers $5c2$ to $5cM$ of the drivers $5d2$ to $5dM$.

The data strings supplied to the shift registers $5c1$ to $5cM$ are transferred to the latch circuits $5b1$ to $5bM$ by the negative-logic latch signal S5.

The drive circuits $5a1$ to $5aM$ are supplied with a power supply voltage S1. By the negative-logic strobe signal S2, the drive circuits $5a1$ to $5aM$ perform predetermined-period energization for only the heating resistors $5t$, which are turned on based on the data strings of the latch circuits $5b1$ to $5bM$ (refer to an energization period T11 of the first gradation).

In a similar way, predetermined-period energization of the second gradation of the first line is performed by energization period T12 of the second gradation, and a predetermined-period energization of the G-th gradation is performed by an energization period T1G of the G-th gradation, whereby a printing period of the first line is ended.

Here, as shown in FIG. 3, the energization period partially overlaps the transfer period to the next heating resistor group. Moreover, the energization period of the G-th gradation of the first line partially overlaps a transfer period of a first gradation of the next second line. In such away, energization processing is performed for the second line to the Q-th line.

Figure 4:
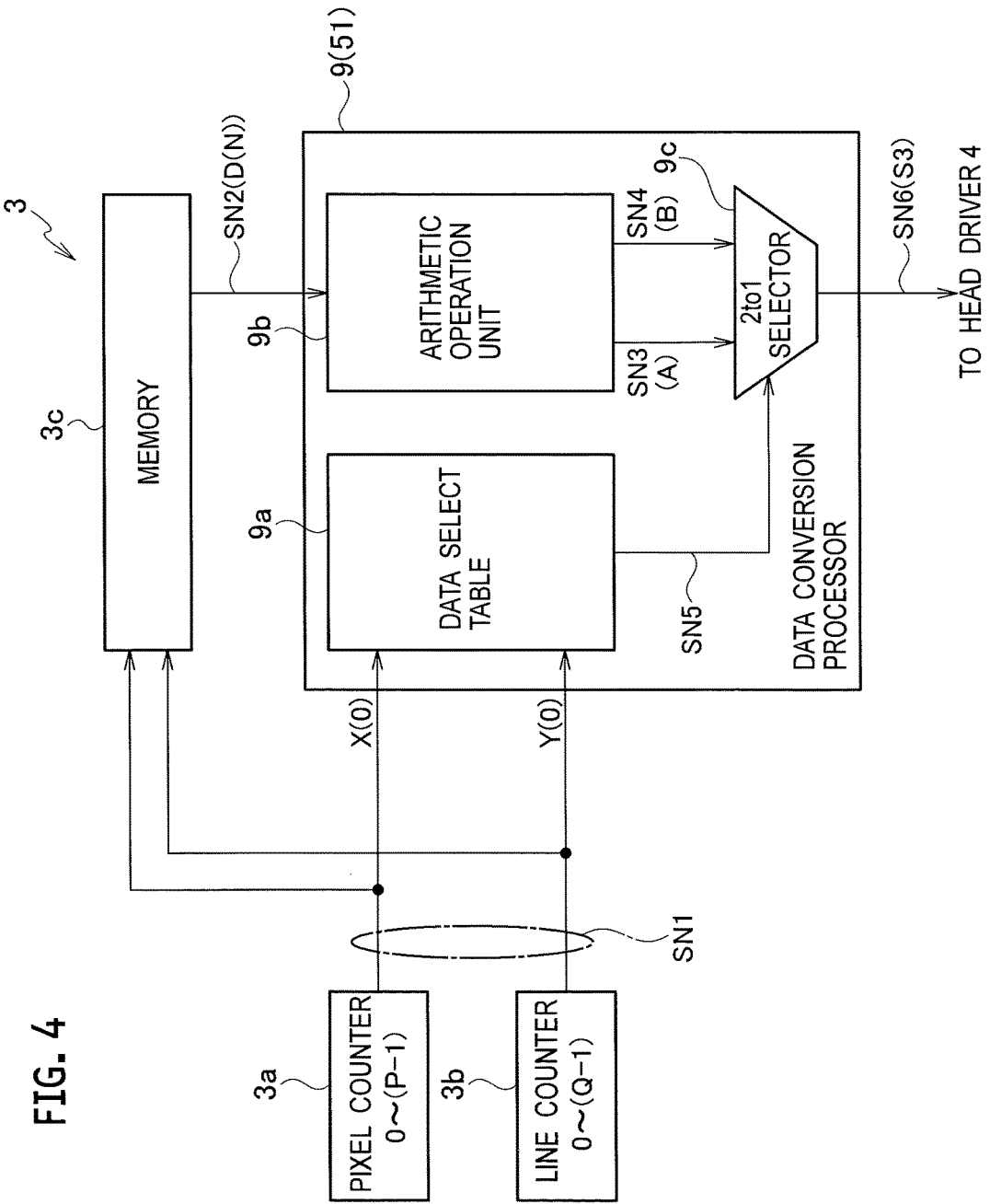
FIG. 4 is a block diagram showing a configuration of data processor 3 including the data conversion processor 9 of Example 1.

Next, a description is made of the data processor 3 with reference to FIG. 4. FIG. 4 is a block diagram showing the configuration of the data processor 3.

The data processor 3 includes pixel counter $3a$, line counter $3b$, and memory $3c$ in addition to the above-mentioned data conversion processor 9 (the gradation data generation device 51).

The data conversion processor 9 includes data select table $9a$, arithmetic operation unit $9b$, and 2to1 selector $9c$ (hereinafter, also simply referred to as a "selector $9c$").

Based on an instruction by the controller 2, the pixel counter 3a outputs an arbitrary pixel address X from among addresses 0 to (P−1) which specify numbers of the heating resistors 5t corresponding to pixels. Based on an instruction of the controller 2, the line counter 3b outputs arbitrary line address Y from among addresses 0 to (Q−1) corresponding to the respective lines.

The pixel address X that is a pixel number and the line address Y that is a line number, which are outputted from the pixel counter 3a and the line counter 3b, respectively, are supplied as address information SN1 of a dot, which is specified by a set (X, Y) of the addresses on two-dimensional printing area AR (refer to FIG. 6), to the memory 3c and the data select table 9a.

The memory 3c stores the information of an image to be printed by the thermal printer 52, the information being included in the data signal Da and supplied from the outside.

Specifically, the memory 3c stores information of "number of pixels P"×"number of lines Q"×"N-bit gradations" (N: positive integer). For example, N is 8, and in this case, the number of gradations G is 256.

The memory 3c receives the address information SN1, and outputs the original gradation data of the dot, which corresponds to the set (X, Y) of the address, as printing data information SN2 to the arithmetic operation unit 9b.

Hereinafter, such N-bit gradation data that is the original gradation data is referred to as "gradation data D(N)".

The pixel address X corresponds to the number of each of the heating resistors 5t in a one-to-one relationship. Specifically, the pixel address X=0 corresponds to #1 of the heating resistors 5t, and the pixel address X=(P−1) corresponds to #P of the heating resistors 5t.

The line address Y corresponds to the line number in a one-to-one relationship. Specifically, the line address Y=0 corresponds to the first line, and the line address Y=Q−1 corresponds to the Q-th line.

The arithmetic operation unit 9b implements processing, which is composed of processing A and processing B, for the printing data information SN2 inputted thereto.

The processing A is processing for converting the gradation data D(N) of the dot, which corresponds to the set (X, Y) of the address into D(N)/2. That is, the N-bit gradation data is divided by 2, whereby high-order (N−1)-bit gradation data (hereinafter, also referred to as "high-order gradation data") is obtained.

The processing B is processing for converting the gradation data D(N) of the dot, which corresponds to the set (X, Y) of the address into D(N)/2, and adding an LSB to the obtained high-order (N−1)-bit gradation data D(N)/2. That is, the gradation data D(N) is defined to be D(N)/2+[LSB of D(N)].

The arithmetic operation unit 9b outputs a result of the processing A as processing A data SN3 to the selector 9c, and outputs a result of the processing B as processing B data SN4 thereto. Hereinafter, the processing A data SN3 and the processing B data SN4 are also referred to as "converted gradation data".

Figures 5, 6:
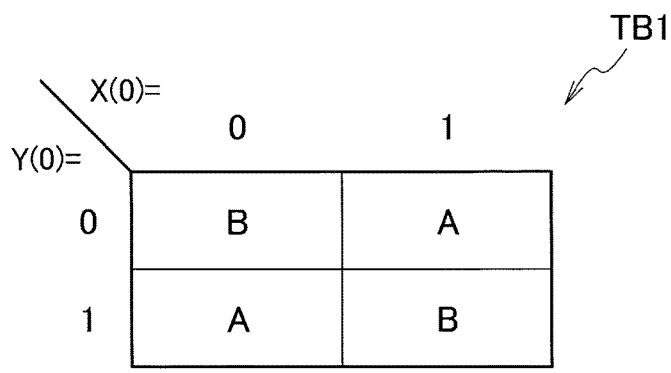
FIG. 5 is a view showing table TB1 stored in data select table 9a which the data conversion processor 9 includes.
FIG. 6 is a view for explaining the setting pattern of processing A and processing B, which are set by the data conversion processor 9.

The data select table 9a stores a table TB1 shown in FIG. 5. X(0) shown in FIG. 5 is 1 bit as the LSB of X, and Y(0) is 1 bit as the LSB of Y.

The table TB1 is a matrix of sets (X(0), Y(0)) of the addresses indicated by the address information SN1. The table TB1 shows that execution of the processing A is selected in the case where either one of X(0) or Y(0) is an even number and the other thereof is an odd number, and that execution of the processing B is selected in the case where both of X(0) and Y(0) are an even number or an odd number.

By this selection, in one line, processing corresponding to the adjacent heating resistors 5t is set alternately between the processing A and the processing B.

Moreover, the setting of the processing A and the setting of the processing B are shifted from each other by an amount of one pixel so that the processing of the heating resistors 5t on the same pixel address differs between the adjacent lines. That is, such a setting is made so that the same processing is not repeated in two successive lines on the same pixel address. In such a way, a density difference to be described later becomes visually inconspicuous.

Example 1 is an example of setting K of low-order K bits in the N-bit original gradation data to 1 (here, N is an integer of 2 or more). A reason why the processing B is the processing for adding the LSB to the gradation data D(N)/2 is that K is set to 1. The lines set so that the same processing is not repeated thereon just needs to be $2^K$-pieces of lines. Note that K is a positive integer that satisfies K<N.

In such a way, as shown in FIG. 6, a setting pattern of the processing A and the processing B in the printing area AR becomes a staggered setting pattern.

The data select table 9a outputs, toward the selector 9c, selection information SN5 as to which of the processing A and the processing B is to be selected in response to the address information SN1 inputted thereto.

The selector 9c selects either one of the processing A data SN3 and the processing B data SN4 in response to the selection information SN5 inputted thereto, converts the selected data into converted gradation data SN6, and outputs the converted gradation data toward the head driver 4.

The converted gradation data SN6 is supplied as the gradation data S3 to the head driver 4.

That is, either one of the processing A data SN3 and the processing B data SN4 is selected and set as the gradation data S3 corresponding to the heating resistor 5t of an arbitrary number in the thermal head 5.

FIG. 7A and FIG. 7B are views for describing recording results which are based on the above-mentioned converted gradation data SN6 (gradation data S3).

As shown in FIG. 7A, in the case where each of the LSBs of the gradation data D(N) of the dots for which the processing B is set is 0, a processing result thereof does not cause a density difference from that in the case where the processing A is executed.

Meanwhile, in a case where each of the LSBs of the gradation data D(N) of the dots for which the processing B is set is 1, then as shown in FIG. 7B, the dots are printed at a density denser by one step than in the case of executing the processing A. FIG. 7B shows the case where the LSBs of the gradation data D(N) corresponding to the processing B become 1 as a whole.

Moreover, in the case where a value of the gradation data D(N) of a certain dot for which the processing B is set is maximum (for example, the case where the value is 255 when N=8 bits), then an overflow occurs with respect to (N−1) bits when the processing B is executed. Therefore, only in that case, not the processing B but the processing A is exceptionally adopted as the processing for that dot.

As mentioned above, the converted gradation data SN6 is converted into the (N−1)-bit data by the data conversion processor 9, and the number of gradations thereof is reduced to the half of that of the original data.

However, the data subjected to the processing A and the processing B are assigned to the respective dots in accordance with the predetermined rule, and accordingly, can visually obtain a double gradation expression by the area gradation. That is, in the thermal transfer recording, a gradation expression that substantially corresponds to the number of gradations by the N-bit data is made possible although the data transfer amount is reduced to half (½; 50%).

Moreover, since the data transfer amount is reduced to ½, the recording time is halved, thus making it possible to perform high-speed recording (high-speed printing).

(Example 2)

The thermal printer 52 may mount thereon a data processor 23, which includes a data conversion processor 29 (a gradation data generation device 251), which is described next, in place of the data processor 3. A description is made below of Example 2 with reference to FIG. 8 to FIGS. 11A-11D. The thermal printer 52 that mounts the data processor 23 thereon has the same configuration as that of the thermal printer 52, which is described with reference to FIG. 1, except that the data processor 23 is substituted for the data processor 3.

Figure 8:
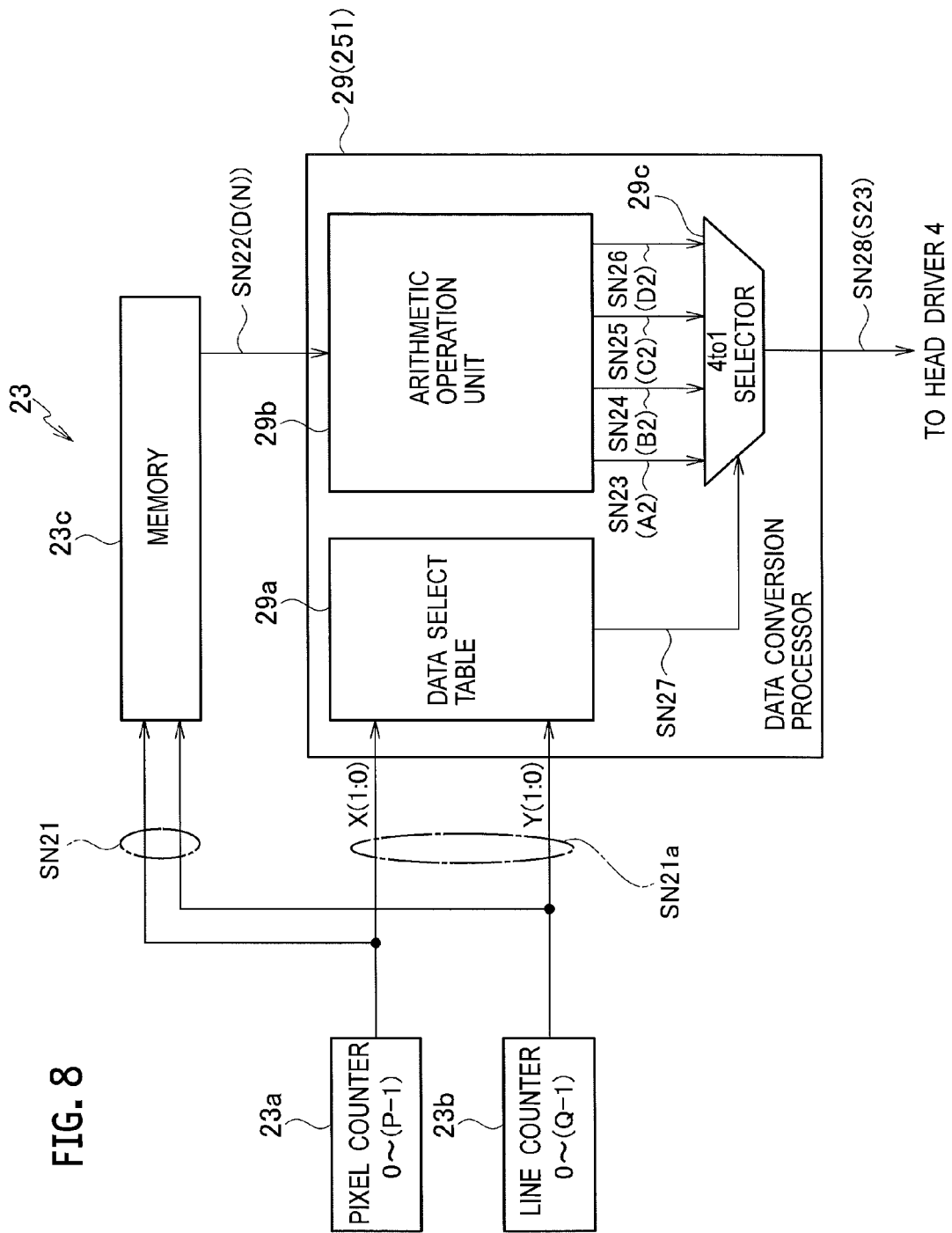
FIG. 8 is a block diagram showing a configuration of data processor 23 including data conversion processor 29 of Example 2.

FIG. 8 is a block diagram for describing the configuration of the data processor 23. The data processor 23 includes a pixel counter 23a, a line counter 23b, and a memory 23c in addition to the data conversion processor 29.

The data conversion processor 29 includes data select table 29a, arithmetic operation unit 29b, and 4to1 selector 29c (hereinafter, also simply referred to as a "selector 29c").

Based on an instruction of the controller 2, the pixel counter 23a outputs an arbitrary pixel address X from among addresses 0 to (P−1) which specify numbers of the heating resistors 5t, corresponding to pixels. Based on an instruction of the controller 2, the line counter 23b outputs an arbitrary line address Y from among addresses 0 to (Q−1), corresponding to the respective lines.

The pixel address X that is a pixel number, and the line address Y that is a line number, which are outputted from the pixel counter 23a and the line counter 23b, respectively, are individually supplied as address information SN21 and address information SN21a of a dot, which is specified by a set (X, Y) of the addresses on the two-dimensional printing area AR2 (refer to FIG. 10), to the memory 23c and the data select table 29a.

A value of X of the address information SN21 is any of 0, 1, 2, 3 . . . , and a value of Y thereof is also any of 0, 1, 2, 3 . . . . As will be described later, the address information SN21a is any one of (0, 0), (0, 1), (1, 0), and (1, 1). The address information SN21a is information indicating association between a set (X, Y) of the address, which is indicated by the address information SN21 and a matrix, which is shown in FIG. 9 and will be described later.

The memory 23c stores the information of an image to be printed by the thermal printer 52, and the information being included in the data signal Da supplied from the outside. Specifically, the memory 23c stores the information of the "number of pixels P"×"number of lines Q"×"N-bit gradations" (N: positive integer).

The memory 23c receives the address information SN21, and outputs gradation data of the dot, which corresponds to the set (X, Y) of the address as printing data information SN22 to the arithmetic operation unit 29b. That is, Example 2 is an example of setting K=2.

Hereinafter, such N-bit gradation data that is the original gradation data is referred to as "gradation data D(N)" in the similar way to Example 1.

X corresponds to the number of each of the heating resistors 5t in a one-to-one relationship. Specifically, the pixel address X=0 corresponds to #1 of the heating resistors 5t, and the pixel address X=(P−1) corresponds to #P of the heating resistors 5t. Y corresponds to the line number in a one-to-one relationship. Specifically, the line address Y=0 corresponds to the first line, and the line address Y=Q−1 corresponds to the Q-th line.

The arithmetic operation unit 29b implements predetermined processing for the printing data information SN22 inputted thereto. This processing is processing A2, processing B2, processing C2, and processing D2, which are shown next.

Processing A2: D(N)/4

Processing B2: D(N)/4+[LSB(0) of D(N) or LSB(1) of D(N)]

Processing C2: D(N)/4+LSB(1) of D(N)

Processing D2: D(N)/4+[LSB(0) of D(N) and LSB(1) of D(N)]

The processing A2 is processing for converting the gradation data D(N) of the dot, which corresponds to (X, Y), into D(N)/4. That is, the N-bit gradation data is divided by $2^2$, whereby high-order (N−2)-bit gradation data (hereinafter, also referred to as "high-order gradation data") is obtained.

The processing B2 is processing for adding 1 to the (N−2)-bit gradation data D(N)/4, which is obtained by processing similar to the processing A2, in the case where either one of LSB-side two bits is 1.

The processing C2 is processing for adding second-bit data from the LSB side in an ascending order to the (N−2)-bit gradation data D(N)/4, which is obtained by processing similar to the processing A2.

The processing D2 is processing for adding 1 to the (N−2)-bit gradation data D(N)/4, which is obtained by the processing similar to the processing A2, in the case where both of the LSB-side two bits are 1.

The arithmetic operation unit 29b outputs the results of the processing A2 to the processing D2 as processing A2 data SN23 to processing D2 data SN26 toward the selector 29c, respectively.

The processing A2 data SN23 to the processing D2 data SN26 are also referred to as "converted gradation data".

The data select table 29a stores table TB2 shown in FIG. 9. X(1:0) shown in FIG. 9 is LSB-side 2 bits of X, and Y(1:0) is LSB-side 2 bits of Y.

The dot can be specified by a matrix of sets (X(1:0), Y(1:0)) of the addresses indicated by the address information SN21a. Based on the address information SN21a, it is decided which point of the $2^2 \times 2^2$ matrix shown in FIG. 9 the dot applies. By the table TB2, it is specified which of the processing A2 to the processing D2 the dot is subjected to.

In printing for one line, the processing A2 to the processing D2 are assigned one by one to four successive heating resistors 5t, and a set of the four pieces of processing thus assigned is repeatedly assigned to the remaining heating resistors 5t.

For example, a dot on the first line, which is subjected to the recording by the #1 heating resistor 5t, applies to X(0, 0) and Y(0, 0), and accordingly, the dot is a dot for which the processing D2 is executed. A dot on the eighth line, which is subjected to the recording by the #7 heating resistor 5t, applies to X(1, 0) and Y(1, 1), and accordingly, the dot is a dot for which the processing A2 is executed.

In such a way, in the printing area AR2, the processing A2 to the processing D2 form a setting pattern shown in FIG. 10.

As obvious from FIG. 10 in Example 2, in order that the processing of the heating resistors 5t, which obtain the same pixel address differs (cannot be repeated) among the $2^K$ pieces (here, four) of lines which are successive, the setting of the processing A2 to the processing D2 is shifted by an amount of arbitrary pixels.

That is, such setting is made so that the same processing is not repeated in four successive lines of the same pixel address. In such a way, a density difference to be described later becomes visually inconspicuous.

The data select table 29a outputs, toward the selector 29c, selection information SN27 as to which of the processing A2 to the processing D2 is to be selected in response to the address information SN21a inputted thereto.

The selector 29c selects any one of the processing A2 data SN23 to the processing D2 data SN26 in response to the selection information SN27 inputted thereto, and outputs converted printing data SN28. This converted printing data SN28 is supplied as the gradation data S23 to the head driver 4.

That is, any one of the processing A2 data SN23 to the processing D2 data SN26 is selected and set as the gradation data S23, corresponding to the heating resistor 5t of an arbitrary number in the thermal head 5.

FIG. 11A to FIG. 11D are views for describing recording results which are based on the above-mentioned converted printing data SN28 (gradation data S23).

As shown in FIG. 11A to FIG. 11D, the dot for which the processing A2 is set is not subjected to the conversion processing, whichever the LSB-side 2 bits of the gradation data D(N) may be.

With regard to the dots for which the processing B2 is set, in the case of FIG. 11B where the LSB-side two bits of the gradation data D(N) become (0, 1) [$(1)_{10}$], in the case of FIG. 11C where the LSB-side two bits of the gradation data D(N) become (1, 0) [$(2)_{10}$], and in the case of FIG. 11D where the LSB-side two bits of the gradation data D(N) become (1, 1) [$(3)_{10}$], then 1 is added to the original data, and the dots are printed at a density denser by one step than in the case of executing the processing A2. $(1)_{10}$, $(2)_{10}$, and $(3)_{10}$ indicate decimal 1, 2, and 3, respectively.

With regard to the dot for which the processing C2 is set, in the case of FIG. 11C where the LSB-side two bits of the gradation data D(N) become (1, 0) [$(2)_{10}$], and in the case of FIG. 11D where the LSB-side two bits of the gradation data D(N) become (1, 1) [$(3)_{10}$], then 1 is added to the original data, and the dots are printed at the density denser by one step than in the case of executing the processing A2.

Moreover, with regard to the dot for which the processing D2 is set, in the case of FIG. 11D where the LSB-side two bits of the gradation data D(N) become (1, 1) [$(3)_{10}$], then 1 is added to the original data, and the dots are printed at the density denser by one step than in the case of executing the processing A2.

In the processing B2 to D2, in the case where a value of the gradation data D(N)/4 of a certain dot is maximum (for example, a case where the value is 255 in a case of N=8 bits), an overflow occurs with respect to the (N−2) bits when the processing B2 to D2 is executed. Therefore, only in that case, not the processing B2 to D2 but the processing A2 is exceptionally adopted as the processing for that dot.

In FIG. 11A to FIG. 11D, the number of dots printed to be denser per unit area differs among them, and a four-step density difference is expressed.

In such a way, the converted gradation data SN28 is converted into the (N−2)-bit data by the data conversion processor 29, and the number of gradations thereof is reduced to one-fourth of that of the original data.

However, the data subjected to the processing A2 to the processing D2 are assigned to the respective dots in accordance with the predetermined rule, and accordingly, can visually obtain a quadruple gradation expression by the area gradation. That is, a gradation expression that substantially corresponds to the number of gradations by the N-bit data is made possible although the data transfer amount is reduced to one-fourth (25%).

Moreover, since the data transfer amount is reduced to one-fourth, the recording time is reduced to one-fourth, thus making it possible to perform higher-speed recording.

The examples according to the present disclosure are not limited to the above-mentioned configuration and procedure, and are modifiable within the scope without departing from the scope of the present disclosure. The data transfer amount reduced with respect to the gradation data (N) is not limited to ½ and ¼ as mentioned above, and may be set to ⅛, 1/16 . . . and $1/2^K$ (K: a positive integer that satisfies K<N).

That is, for the N-bit gradation data D(N) applied to each of the dots, $2^K$ ways of processing methods are preset, which are obtained by individually adding the gradation data of the high-order (N−K) bits thereof and $2^K$ ways of data of the low-order K bits thereof to each other. Then, each of the data conversion processors 9 and 29 assigns the $2^K$ ways of processing methods one by one to $2^K$ pieces of the successive dots in one line to be recorded, and obtains the gradation data of each of the dots.

In such a way, an amount of the gradation data handled in the head driver 4 and the following units is reduced to $1/2^K$, and the recording time is reduced to $1/2^K$ following this. Moreover, the number of gradations obtained visually becomes one that is substantially based on the N-bit gradation data. That is, even when the number of bits of the gradation data is reduced, it is possible to perform a multi-level gradation expression.

The assignment method of assigning the $2^K$ ways of processing methods one by one to the $2^K$ pieces of successive dots is not limited to the above-mentioned pattern. For example, in Example 2 with K=2, the description is made of the example of assigning the processing methods in order of D2-C2-B2-A2; however, this order may be changed as appropriate, for example, to D2-B2-C2-A2.

Moreover, the assignment positions on the lines adjacent to each other can be set as appropriate. In each of Example 1 and Example 2, there is shown the example where the processing methods are assigned so as not to be repeated on the adjacent lines; however, the present disclosure is not limited to this.

Example 1 and Example 2 adopt the configurations in which the respective pieces of processing are assigned to the heating resistors 5t based on the tables TB1 and TB2 stored in the data select tables 9a and 29a; however, the assignment method is not limited to this, and an assignment method using arithmetic operation processing or the like is also applicable. However, also in this case, it is desirable that the $2^K$ ways of the processing methods be assigned at a uniform frequency.

As the thermal printer 52, one is described which energizes and drives the heating resistors 5t of the thermal head 5 by the plurality of drivers 5d; however, the present disclosure is not limited to this. The thermal printer 52 may be one in which one driver energizes and drives all of the heating resistors 5t of the thermal head 5.

Usually, the thermal printer can process 8 or 10-bit gradation data. The gradation data generation device (or method) of each of the examples is applied to the thermal printer, thus making it possible to use more multi-bit gradation data than that with a processable number of bits (8 or 10) as the original gradation data serving as a source. Hence, the number of gradations visually recognized is increased more, and accordingly, recording quality is enhanced.

Moreover, in the case of using the general 8 or 10-bit data as the original gradation data serving as a source, the thermal printer to which the gradation data generation device (or method) of each of the examples is applied may be one having performance capable of processing no more than gradation data of which the number of bits is smaller than the processable number of bits (8 or 10). Even in this case, recording quality with the number of gradations, which is equivalent to that of the original gradation data, is obtained while using the gradation data with a small number of bits.

What is claimed is:

1. A gradation data generation device comprising:
an arithmetic operation unit configured, when N is an integer of 2 or more and K is a positive integer that satisfies K<N, to perform $2^K$ ways of processing, which are a sum of $2^K-1$ ways of processing for obtaining converted gradation data based on addition of high-order gradation data composed of high-order (N−K) bits of N-bit original gradation data and low-order K-bit data of the original gradation data, and processing directly using the high-order gradation data as the converted gradation data; and
a selector configured to select, in response to each of a plurality of heating resistors, any of the converted gradation data as gradation data for performing gradation recording by using a line thermal head including the plurality of heating resistors, the converted gradation data being obtained by the $2^K$ ways of processing.

2. The gradation data generation device according to claim 1, further comprising a data select table configured to store a table in which a correspondence relationship is set so that the $2^K$ ways of processing and $2^K$ pieces of the successive heating resistors in the line thermal head are allowed to correspond to each other in a one-to-one relationship, wherein
the selector selects the converted gradation data based on the correspondence relationship set in the table.

3. The gradation data generation device according to claim 2, wherein, in the table, the correspondence relationship is set so that the $2^K$ ways processing is not repeated in heating resistors having the same pixel address on $2^K$ pieces of successive lines.

4. The gradation data generation device according to claim 1, wherein N is 8 or 10, and K is 1 or 2.

5. A gradation data generation method comprising:
obtaining high-order gradation data composed of high-order (N−K) bits of N-bit original gradation data, where N is an integer of 2 or more, and K is a positive integer that satisfies K<N;
executing $2^K$ ways of processing, which are a sum of $2^K-1$ ways of processing for obtaining converged gradation data and processing of directly using the high-order gradation data as the converted gradation data, based on addition of the obtained high-order gradation data and low-order K-bit data of the original gradation data; and
selecting, in response to each of a plurality of heating resistors, any of the converted gradation data as gradation data for performing gradation recording by using a line thermal head including the plurality of heating resistors, the converted gradation data being obtained by the $2^K$ ways of processing.

* * * * *